United States Patent

[11] 3,614,230

| [72] | Inventor | Harry M. Crawford |
| | | Port Murray, N.J. |
| [21] | Appl. No. | 822,967 |
| [22] | Filed | May 8, 1969 |
| [45] | Patented | Oct. 19, 1971 |
| [73] | Assignee | Esso Research and Engineering Company |

[54] APPARATUS AND METHOD FOR SAMPLING AND ANALYZING FLUID SOLIDS
6 Claims, 4 Drawing Figs.

[52] U.S. Cl. .................................................. 356/36,
23/253, 250/218, 356/38, 356/72, 356/207,
356/210, 356/244
[51] Int. Cl. ...................................................... G01n 1/00,
G01n 21/00, G01n 21/48
[50] Field of Search ............................................. 356/36–38,
102–104, 207–209, 216, 244–246, 72; 23/253;
250/218

[56] References Cited
UNITED STATES PATENTS

| 2,547,545 | 4/1951 | Strong ........................... | 356/209 X |
| 2,868,062 | 1/1959 | Haley ............................ | 356/209 X |
| 3,010,798 | 11/1961 | Whitehead ..................... | 356/72 X |
| 3,065,665 | 11/1962 | Akhtar et al. .................. | 356/210 |
| 3,232,711 | 2/1966 | Senyk et al. ................... | 23/253 |
| 3,290,119 | 12/1966 | Ohlgren et al. ................ | 356/209 X |
| 3,411,342 | 11/1968 | Liermann ....................... | 356/72 X |

Primary Examiner—Ronald L. Wibert
Assistant Examiner—Warren A. Sklar
Attorneys—Manahan and Wright and Jay Simon ABSTRACT: Method and apparatus for collecting and analyzing fluidized solids samples, e.g., determining carbon content on fluid catalytic cracking catalyst, comprising means for collection and defluidizing sample, means for analyzing sample by light reflectance and means for sealing moving parts and analysis chamber from solids contamination.

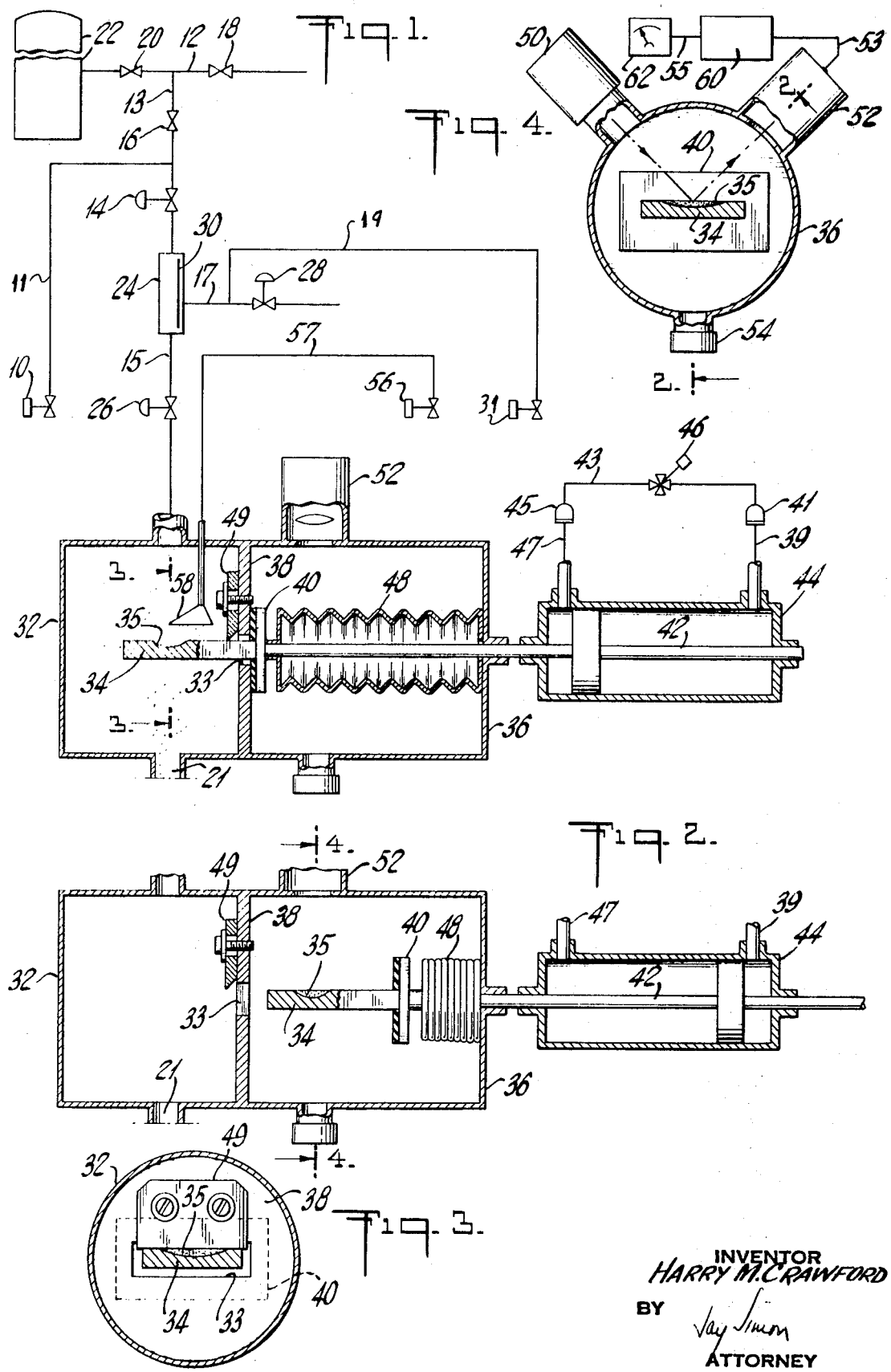

APPARATUS AND METHOD FOR SAMPLING AND ANALYZING FLUID SOLIDS

FIELD OF INVENTION

This invention relates to a method and apparatus for analyzing finely divided solids employed in fluid solids processes, e.g. fluid catalytic cracking. More particularly, this invention relates to a method and apparatus for analyzing fluid solids on an intermittent basis which comprises means for collecting the fluid solids sample, means for defluidizing the sample, means for preparing the sample including means for sealing moving parts and analysis means, and means for analyzing the sample by light reflectance measurements. In a particular embodiment hereof, this invention relates to a method and apparatus for determining the amount of carbon or coke on a cracking catalyst contained in a fluid bed regenerator or in a catalyst transfer line leading to or from said regenerator.

PRIOR ART

In continuous fluid solids processes, such as fluidized catalytic cracking of hydrocarbons or the fluidized iron ore reduction process, it is essential to have a quick and reliable method for analyzing the fluid solids. For example, in fluid catalytic cracking of hydrocarbons, coke or carbon buildup on the fluidized catalyst particles retard the efficiency of the cracking operation by reducing catalyst activity. The catalyst must then be regenerated in a separate zone, e.g., by burning off the carbon with oxygen or by steaming, before it can be returned to its normal activity. While cracking cycles and regenerating cycles can be predetermined, there must necessarily be some checkpoint for determining the efficiency of the regeneration cycle. Preferably, a sample taken from the transfer pipe which passes regenerated catalyst back to the cracking zone is analyzed for carbon. Since the cracking and regenerating processes are continuous, it is obvious that the carbon analysis must be rapid. Consequently, a combustion analysis of the sample in a laboratory (e.g., using methods such as ASTM D-189 for measuring Conradson carbon, or ASTM D-524, the Ramsbottom method) is far too time consuming to be of use. For example, while waiting for analysis results carbon buildup could occur leading to loss of catalyst activity and fluidization. On the other extreme, very low levels of carbon can cause afterburning in the regenerator and damage the internals through the excessible generation of heat.

It has also been recently proposed to analyze for carbon on catalysts by a continuous method employing a conveyor belt to move the catalyst and light reflectance to analyze the sample. While this method has achieved some rather limited success, it suffers the basic disadvantage of all continuous analysis methods, that is, catalytic cracking processes operate at about 850°–1,050° F. and temperatures in the regenerator may reach as high as 1,100° F. or 1,150° F. Continuous methods must necessarily deal with problems of handling rather hot fluidized solids. Further, once the process is continuous, relatively large amounts of solids must be handled necessitating relatively large transfer lines which tend to clog, retain samples, and contaminate later samples thereby affecting the reliability of the results.

By the practice of this invention, however, a method and apparatus are provided whereby samples are withdrawn from the regenerator standpipe or from any fluid solids process chamber intermittently, i.e., batchwise, thereby allowing the collection of small samples, permitting small lines, and also permitting extensive cooling of the sample without using artificial cooling means. Further, since the lines are small, e.g., in the order of about ⅝-inch diameter, they can readily be kept clean by high-pressure air blasts and sample line plugging can be avoided.

SUMMARY OF THE INVENTION

In accordance with this invention, therefore, a method and apparatus are provided whereby fluidized solids may be quickly and reliably analyzed. Thus, the invention described herein comprises collecting a fresh fluid solids sample (uncontaminated by solids from previous samples) from a fluid solids process, defluidizing the sample by defluidizing means, collecting the sample in a sample collection chamber, preparing and leveling the sample in the sample collection chamber (all the while allowing the sample to cool by exposure to ambient temperatures, e.g., room temperature), transferring the sample to an analysis chamber, the analysis chamber being kept free of excess solids, i.e., solids other than the sample, by maintaining sealing means between the analysis chamber and the sample collection chamber during deposition of the sample in the sample collection chamber, and analyzing the sample by light reflectance means.

The use of light reflectance means to analyze finely divided solids particularly carbon on fluid cracking catalysts is well known and does not here require a detailed description. Suffice it to say that the correlation between light reflectance and carbon content on catalysts has long been established. One of the earliest records of this technique is described by John H. Ramser and Robert P. Hamlen, Carbon Analysis of Cracking Catalyst through Reflection Measurements, Presented Before a Joint Symposium on Automatic Analytic Methods in the Petroleum Industry, Division of Petroleum Chemistry, American Chemical Society, Chicago Meeting, Sept. 6–11, 1953. This paper describes the procedure and equipment employed in such measurements and also shows a calibration curve which converts the signal from the photoelectric cell directly into percent carbon. Also, W. P. Potter, R. S. Tooley, and J. C. Davidson, Carbons on Catalyst Analyzer Boosts Fluid Cracking Unit Performance, The Oil and Gas Journal, Dec. 26, 1966, describes an analysis system employing light reflectance measurements. Thus, excellent results have been obtained by the use of light radiation having a plurality of wavelengths that are at least representative of a wavelength band of about 350–400 millimicrons, but the invention herein is not to be limited to the use of light of this broad wavelength band, as good results can also be obtained with light radiation having a wavelength of only about 400 millimicrons. The radiation not absorbed by the sample, i.e., the reflected light, is electrically detected and converted to output signals whose intensity is related to the amount of radiation absorbed by the sample, and, therefore, under Beer's Law, the concentration of carbon in a sample, for example, of fluid catalytic cracking catalyst, can be determined.

While light reflectance measurements are herein described as applicable for determining percent carbon on a cracking catalyst, it has also been found that light reflectance measurements correlate rather closely with percent metallization in fluid iron ore reduction process. By percent metallization is meant (% metallic Fe)/(total Fe), where the total Fe is the iron present in both metallic and oxide forms. (An example of a fluid iron ore reduction process may be found in U.S. Pat. No. 3,341,322).

Fluid catalytic cracking can employ a variety of catalysts, the alumina-silica types being in wide use. However, other silica based catalysts such as silica-magnesia and silica-zirconia can also be employed. Zeolite catalysts have recently become quite popular. Such catalysts are generally highly crystalline alumino-silicates used either alone or mechanically admixed or composited with synthetic or naturally occurring components such as clay, hydrous oxide gels, gels of mixed hydrous oxides which may be inert or have some catalytic activity. Synthetic zeolites containing alkali metals, e.g. sodium, potassium, etc., or aluminum are also widely used. For a rather detailed discussion of the various catalysts employed in fluid catalytic cracking, one can refer to U.S. Pat. No. 3,412,013.

The particle sizes of the solids being fluidized are not generally critical since fluidization rates for various size particles are well known. Normally, however, particle sizes may range from a few microns, e.g., 10 microns to as high as 150 to 200 microns and higher in some cases, the major portion of fluid cracking catalysts usually being in the range of about 20 to 80 microns.

Regeneration of fluid cracking catalysts generally reduces the carbon level on the catalyst from upward of 1 percent to as little as about 0.2 percent to about 0.7 percent by weight, although this amount can vary in different cracking units. If the light reflectance analyzer is to be satisfactory, it must be able to delineate carbon content in that range. Nevertheless, readily available carbon-on-catalyst analyzers employing light reflectance can easily discriminate carbon levels of from about 0.2 percent to 1.5 percent by weight of carbon. Examples of such instruments are duPont Model 400 Photometric Analyzer, Lumetron Photoelectric Colorimeter Model 402–E, the latter having a 100 candle power incandescent lamp, the light from which is split into two beams, one beam being reflected from the sample and intercepted by a measuring photocell, the other beam falling directly on a comparison photocell. The output voltages of the two cells are compared by means of a bridge circuit through adjustment of a potentiometer knob until a null is obtain on a galvanometer.

DRAWING DESCRIPTION

FIG. 1 is a schematic representation of the means for sample collection and analysis.

FIG. 2 is a section through the analysis means showing the sample in position for analysis.

FIG. 3 is a section through the sample collection chamber.

FIG. 4 is a section through the analysis chamber showing the method of analysis.

Turning now to FIG. 1, where identical numerals are utilized to denote identical parts, the sample collection and analysis procedure may start with the opening of solenoid valve 10 on high-pressure line 11. With sample collection valve 14 closed, block valve 20 and block valve 16 open and 18 closed, high-pressure gas, e.g., air, in line 11 is utilized to blow the lines clean and return any solids to the regenerator. This procedure insures that a fresh sample will be collected for analysis each time and that the sample will be free of contamination from solids remaining from previous samples. When the lines are clean, solenoid valve 10 closes, block valves 20 and 16 remain open and sample collection valve 14 is opened, thereby allowing a fresh sample to flow from the regenerator standpipe 22 through lines 12 and 13 into the defluidization zone 24. It should be noted that fluid solids are quite abrasive and, therefore, the lines for handling these solids should be well polished and of a hard material, such as stainless steel, e.g., 304 stainless, steel. Sample drop valve 26 is, of course, closed to permit the collection of the sample. After collection of a suitable sample, e.g., about 100 cc., in the defluidization zone 24, but before defluidization zone 24 is filled up to sample collection valve 14 (so that valve 14 will not close on solids), sample collection valve 14 is closed. It is noted that defluidization zone 24 is shown as a separate receptacle for samples. However, zone 24 may simply be the length of line 15 between sample collection valve 14 and sample drop valve 26. The fluidized sample in zone 24 is allowed to become quiescent, e.g., in a few seconds, and the fluidizing gas, which is generally at a pressure above atmospheric, is vented from zone 24 through line 17 and open gas bypass valve 28 and thence to the atmosphere or fluidizing gas storage. Valve 28 is then closed. To prevent the loss of any sample from zone 24 while venting the fluidizing gas, the entrance to line 17 is tightly screened by a screen filter 30. Obviously, the filter must be such as to prevent the loss of the smallest particle size sample. The sample is then moved from defluidization zone 24 by opening valve 31 and allowing low-pressure air from line 19 to push the sample out of zone 24 through line 15 and opened valve 26 into sampling chamber 32 where it falls upon slide 34 at depression 35, the latter being positioned directly under line 15. Since the sample particles are quite small, some of the sample will fall on other portions of slide 34 and still other portions of the sample will flow past slide 34 and fall through the exit port 21 to a spent sample drum (not shown). When the sample has been collected on slide valve 34, valve 31 is closed and sample drop valve 26 is closed to await the collection of a new sample for analysis. By virtue of the finely divided solids dropping into sampling chamber 32, this chamber will be rather dusty. In order to avoid, insofar as is possible, the transfer of dust (finely divided solids) to analysis chamber 36 and to keep chamber 36 clean the two chambers are separated by partition 38 and the port 35 communicating chamber 32 and chamber 36 is sealed by sealing means 40 mounted on slide 34. The sealing means is affixed to slide 34 in such a manner that when the slide is in its extended position, i.e., depression 35 is under line 15, sealing means 40 (which may be a metal backed gasket, the gasket contacting partition 38) is compressed against partition 38 thereby sealing off the two chambers and preventing solids from entering the analysis chamber 36.

Now, slide 34, which contains sample in depression 36, can be the extension of a piston rod 42 which is positioned in hydraulic cylinder 44. The cylinder is controlled by four-way solenoid valve 46. As the slide is pulled from sampling chamber 32 into analysis chamber 36, valve 46 controls the flow of hydraulic oil from cylinder 44 through line 39 into oil reservoir 41 through line 43, oil reservoir 45, line 47 and back into the cylinder. As slide 34 is drawn into chamber 36, scrapping means 49, e.g., a doctor blade (the knife edge of which can be metal or rubber), cleans off the surface of a slide 34 so that the only solids entering analysis chamber 36 are contained in the depression 35 of slide 34. Another selling means, e.g., bellows 48, preferably elastomeric, is mounted on the extension of piston rod 42 and prevents any solids from entering the hydraulic cylinder 44.

Turning now to FIG. 2, slide 34 is shown positioned in line with the light source and photocells and bellows are compressed around the extension of piston 42.

FIG. 3 is a left-hand view of a section looking into sample collection chamber 32. Scraper means —9 is shown mounted in a position where it can remove excess solids deposited on slide 34 and allow sample in depression 35 to be levelled and ready for analysis.

Turning to FIG. 4, slide 34 with sample for analysis in depression 35 is shown in line for analysis by a light source emanating from zone 50 at, for example, a 45° angle, and light is reflected from the sample at a 45° angle, into zone 52 where 2 photocell and amplifier (not shown) are positioned and generate a voltage output in proportion to the reflected light, which output can be correlated to the carbon concentration on the sample. A cap 54 is positioned below the slide for maintenance and for removal of any solids that may accumulate in analysis chamber 36.

The photocell generates a voltage signal in line 53 which is attenuated, amplified in zone 60 and sent to recording or indicating means 62 by line 55. The signal being converted to percent carbon by calibration of the indicating scale. The signal can also be converted through a computer to digital data.

After the sample has been analyzed, and returning to FIG. 1, the flow of hydraulic oil is reserved and piston rod 42 moves slide 34 back into sample collection chamber 32 such that sealing means 40 seals sample collection chamber 32 from analysis chamber 36. Valve 56 is then opened and a low-pressure purge gas flows through line 57 and through purge means 58 to blow the solids sample out of depression 35 on slide 34, the solids exiting the sample collection chamber 32 via exit port 21.

It should be noted again that the abrasiveness of finely divided solids necessitates regular inspection periods and replacement of work parts. Further, it s preferred that valves on lines handling the solids be of the eccentric type, e.g., Dezurik, to eliminate galling as much as possible.

Having now described the invention, variations and modifications of which will be readily apparent to those skilled in the art, the following claims are presented to point out that which is believed to be the invention herein

What is claimed is:

1. A method for analyzing fluid solids utilized in a high-temperature fluid solids process reactor which comprises:

intermittently withdrawing a sample of fluid solids from said fluid solids reactor and transferring said sample to a sealed defluidization chamber;

retaining said sample in said defluidization chamber until said sample is quiescent and thereafter venting gases from said chamber;

removing said sample from said defluidization chamber;

depositing and collecting said sample in a sample collection chamber while maintaining said sample collection chamber sealed from an analyzing chamber;

removing said collected sample to said analyzing chamber; and illuminating said sample with light, detecting the light reflected by said sample, the intensity of said reflected light being related to the condition of the sample whereby said sample is analyzed.

2. The method of claim 1 including leveling said sample in said sample collection zone.

3. The process of claim 1 wherein said step of withdrawing comprises withdrawing fluid solids from the outlet of a fluid solids catalyst regeneration zone.

4. Apparatus for analyzing fluid solids utilized in a high-temperature fluid solids process reactor which comprises:

gastight sample vessel;
sampling chamber;
analysis chamber;

means for withdrawing a sample of said fluid solids from said process reactor into said sample vessel;

means for intermittently venting said sample vessel;

means for transferring said sample to said sampling chamber;

means for collecting said transferred sample in said sample chamber;

means for transferring said collected sample to and from said sampling chamber and said analysis chamber; and sealing means for maintaining said sampling chamber and said analysis chamber in sealing relationship, said analysis chamber having means for illuminating said sample with light and means for detecting light reflected from said sample, the intensity of said reflected light being related to the condition of said sample whereby said sample is analyzed; and means for purging analyzed sample from said sampling chamber.

5. The apparatus of claim 4 wherein said sample vessel includes filter means for preventing substantial loss of said sample through said means for venting said sample vessel.

6. The apparatus of claim 4 wherein said means for withdrawing said fluid solids includes means for purging residual solids in said withdrawing means with a high pressure gas.